United States Patent [19]

Ellefson

[11] Patent Number: 4,976,450

[45] Date of Patent: Dec. 11, 1990

[54] MOBILE TOOL CHEST WITH HORIZONTAL PIVOTAL TRAYS

[76] Inventor: Laurence M. Ellefson, 508 Canyon Dr., Solana Beach, Calif. 92075

[21] Appl. No.: 371,191

[22] Filed: Jun. 26, 1989

Related U.S. Application Data

[63] Continuation of Ser. No. 154,369, Feb. 10, 1988, abandoned.

[51] Int. Cl.[5] .................... B62B 3/02

[52] U.S. Cl. .................... 280/79.11; 280/47.35; 280/755; 248/280.1; 248/364; 108/103

[58] Field of Search ............ 248/364, 282, 283, 289.1, 248/280.1; 108/103, 94; 312/281, 282, 276; 280/47.34, 47.35, 79.1 R, 79.1 A, 79.3, 755, 758, 759, 47.23

[56] References Cited

U.S. PATENT DOCUMENTS

| | | | |
|---|---|---|---|
| 1,550,205 | 5/1924 | Cemazar | 49/193 |
| 1,933,009 | 9/1931 | Epton et al. | 16/147 |
| 2,136,843 | 4/1937 | Dinkel | 312/201 |
| 2,650,388 | 8/1950 | White | 16/230 |
| 2,775,498 | 12/1953 | Gettel | 312/324 |
| 2,903,315 | 8/1955 | Schory et al. | 312/214 |
| 2,981,549 | 1/1959 | Hotton | 280/47.35 |
| 3,345,025 | 10/1967 | Shawfrank | 248/364 |
| 3,733,749 | 5/1973 | Parera | 49/193 |
| 3,889,419 | 6/1975 | Maleck | 49/382 |
| 3,896,588 | 7/1975 | Doffin | 49/394 |
| 4,120,549 | 10/1978 | Bureau | 312/DIG. 33 |
| 4,239,308 | 12/1980 | Bradley | 312/201 |
| 4,466,676 | 8/1984 | Nilsson | 312/222 |
| 4,542,909 | 9/1985 | Littwine et al. | 280/47.35 |
| 4,560,078 | 12/1985 | Dubuisson | 312/201 |

*Primary Examiner*—Charles A. Marmor
*Assistant Examiner*—Richard Camby
*Attorney, Agent, or Firm*—Brown, Martin, Haller & McClain

[57] ABSTRACT

A mechanic's mobile tool chest comprising: a plurality of cantilevered horizontal pivotal tool trays mounted on a chest containing a plurality of drawers enclosed within inwardly recessed top, rear, and side panels. The top panel having a top opening, with the rear and side panels having an outside and top opening. The tool trays are pivotally mounted on posts which are vertically extendible from corners of the chest for positioning the tool trays in an elevated position over vehicle fenders or similar structures. A plurality of cantilevered, horizontal pivotal arms are also mounted on the posts for mounting articulating lamps to illuminate a working area. The chest is mounted on a base with a plurality of wheels and a counterweight attached to prevent over-turn during normal operating conditions with the pivotal tool trays extended. The tool chest may also comprise a door which opens to approximately 260 degrees from either side with inside recessed stowage trays. In excess of about 200 commonly used tools are stowed and displayed in an orderly manner for ready access in the door, top, side, and rear recessed panels of the chest and lower two pivotal tool trays when the door and pivotal trays are extended. The top pivotal tray provides temporary stowage for special tools and parts. Infrequently used tools are stowed in the plurality of drawers.

21 Claims, 10 Drawing Sheets

MOBILE TOOL CHEST WITH HORIZONTAL PIVOTAL TRAYS

This is a continuation of application Ser. No. 07/154,369, filed Feb. 10, 1988 now abandoned.

BACKGROUND

FIELD OF INVENTION

This invention relates to mechanic's tool chests and more particularly to a mobile tool chest capable of securing and displaying in excess of 200 commonly used tools in a stowed orderly manner for ready access and for stowing infrequently used tools in a plurality of drawers. The invention further relates to a mobile tool chest having a plurality of vertically extendable pivot posts mounting a plurality of cantilevered horizontal pivotal tool trays. A plurality of cantilevered horizontal arms are also mounted to the posts for mounting articulating lamps for illuminating an immediate working area.

BACKGROUND

Description of the Prior Art

As vehicles have become more complicated, the need for more specialized tools emerged, including the added requirement for metric tools. As a result, tool boxes changed to tool chests, which grew in size to tool stands, too large to easily move to an immediate work area. Exemplary tool chests are found in U.S. Pat. Nos. 2,981,549 and 4,120,549. On Jan. 16, 1959 U.S. Pat. No. 2,981,549 for a mobile tool stand was issued. This patent discloses a tool stand with a plurality of drawers accessible from one side and a flat top for a working area and temporary placement of tools and parts, mounted on wheels and casters to provide mobility to the tool cabinet. However, the requirement for more tools has continued to increase. Tool chests were mounted on top of the mobile tool stands eliminating most of the work area. As a result, small side shelves were installed for temporary stowage of tools and parts.

On Oct. 17, 1978, U.S. Pat. No. 4,120,549 was issued for a sheet metal tool chest support with a sliding work shelf. This elevated the tool chest above the top of the tool stand and provided an extendible shelf in the front and below the tool chest with vertical clearance space between the extendible shelf and the lower drawer of the elevated tool chest. However, access to the drawers of the tool stand directly below the extended shelf is limited. To acquire access to the top drawers of the tool stand, the extendible shelf must be retracted, as a result, parts and tools must be removed. Racks with a plurality of holes have been mounted on the sides of tool stands or shelves for temporary stowage of screw and nut drivers. However, to insure security of these tools, they must be removed and restored in the drawers when securing the tools. This is time-consuming and a duplication of stowage. When a presently designed mobile tool chest is unlocked and ready for use, ready access to tools is limited unless a drawer is pulled out, usually at an inconvenient level.

To date, illumination of a mechanic's immediate work area remains inadequate and generally consists of high overhead lights supplemented by an extension light, the latter being difficult to locate and direct to a desired position.

The above description of the prior art describes the evolution of the present mobile tool chest. It is obvious there are no provisions for organized placement of tools and parts for ready access from the immediate working area, primarily the engine compartment of a vehicle. Therefore, what is needed is a more convenient and efficient mobile tool chest that enhances the working area around a vehicle and provides for securing and displaying a plurality of tools in an orderly manner for ready access and providing additional direct illumination of the immediate working area.

SUMMARY OF THE INVENTION

In view of the shortcomings of the prior art, an object of the invention is to provide an integrated mobile tool chest which greatly improves a mechanic's efficiency by substantially reducing time, motion, and frustration.

Another object of the invention is to provide a mobile tool chest having a plurality of cantilevered horizontal pivotal tool trays mounted on vertically extendable pivot posts for convenient tools and parts support.

It is an advantage of the invention that it provides a directable source of light to a work area.

A purpose of the invention is to provide a mobile tool chest having ready access to a large number of tools while maintaining security.

These and other objects, advantages, and purposes are realized in a tool chest comprising: a plurality of cantilevered horizontal pivotal tool trays mounted on a chest containing a plurality of drawers enclosed within inward recessed top rear and side panels. The top panel having a top opening, with the rear and side panels having outside and top openings. The tool trays are pivotally mounted on two vertical extendable pivot posts encased and extending from upstanding tubes attached to the rear corners of the chest. This provides for positioning the pivotal trays in an elevated position over vehicle fenders or similar structures. A plurality of cantilevered horizontal pivotal arms are also mounted on the posts for mounting articulating lamps to illuminate a working area. The chest is mounted on a base with a plurality of wheels and a counterweight attached to prevent over-turn during normal operating conditions with the pivotal tool trays extended.

The chest may also comprise a door which opens to approximately 260 degrees from either side with inside recessed stowage trays. In a further aspect of the invention, the most commonly used tools in excess of 200, are stowed and displayed in an orderly manner in racks recessed in the top, rear, and side panels and the lower two horizontal pivotal trays. All these tools are readily accessible from the top when the pivotal trays are extended. The top pivotal tray provides temporary stowage for parts and special tools required for the task at hand. The middle pivotal tray provides stowage for a plurality of miscellaneous tools such as pliers, cutters, hammers, distributor wrenches, etc. The lower pivotal tray provides stowage for a plurality of open end, box end, and combination wrenches. The side tool racks mounted within the recessed side panels provide stowage for a plurality of screw and nut drivers. The rear tool rack mounted within the recessed rear panel provides stowage for various tools, longer than the length of the top stationary tool tray, such as pry bars and torque wrenches. Power tools and accessories comprising: impact wrenches, power drivers, and a drill motor, are stowed inside the recessed door and are readily available when the door is opened to a desired position.

Infrequently used tools are stowed in a plurality of drawers.

An additional object and advantage is an electrical distribution system comprising: a retractable electrical extension cord to provide electrical power from an external power source to a junction box mounted on the tool chest; an electrical extension light connected to the junction box; and a plurality of electrical duplex outlets connected to the junction box to provide power to articulating lamps mounted on cantilevered pivotal arms and to portable electric tools. The tools are secured when a hinged rear security panel is latched over the top rear edge of the chest; the pivotal trays are latched directly above the chest; and the door is locked in the closed position. Further objects and advantages of my invention will become apparent from a consideration of the ensuing description and the accompanying drawings.

MOBILE TOOL CHEST WITH HORIZONTAL PIVOTAL TRAYS—DESCRIPTION

Brief Description of the Drawings

The novel features of the present invention may be better understood from the accompanying description when taken in conjunction with the accompanying drawings in which like characters refer to like parts and in which.

DETAILED DESCRIPTION OF A PREFERRED EMBODIMENT

Figure 1:
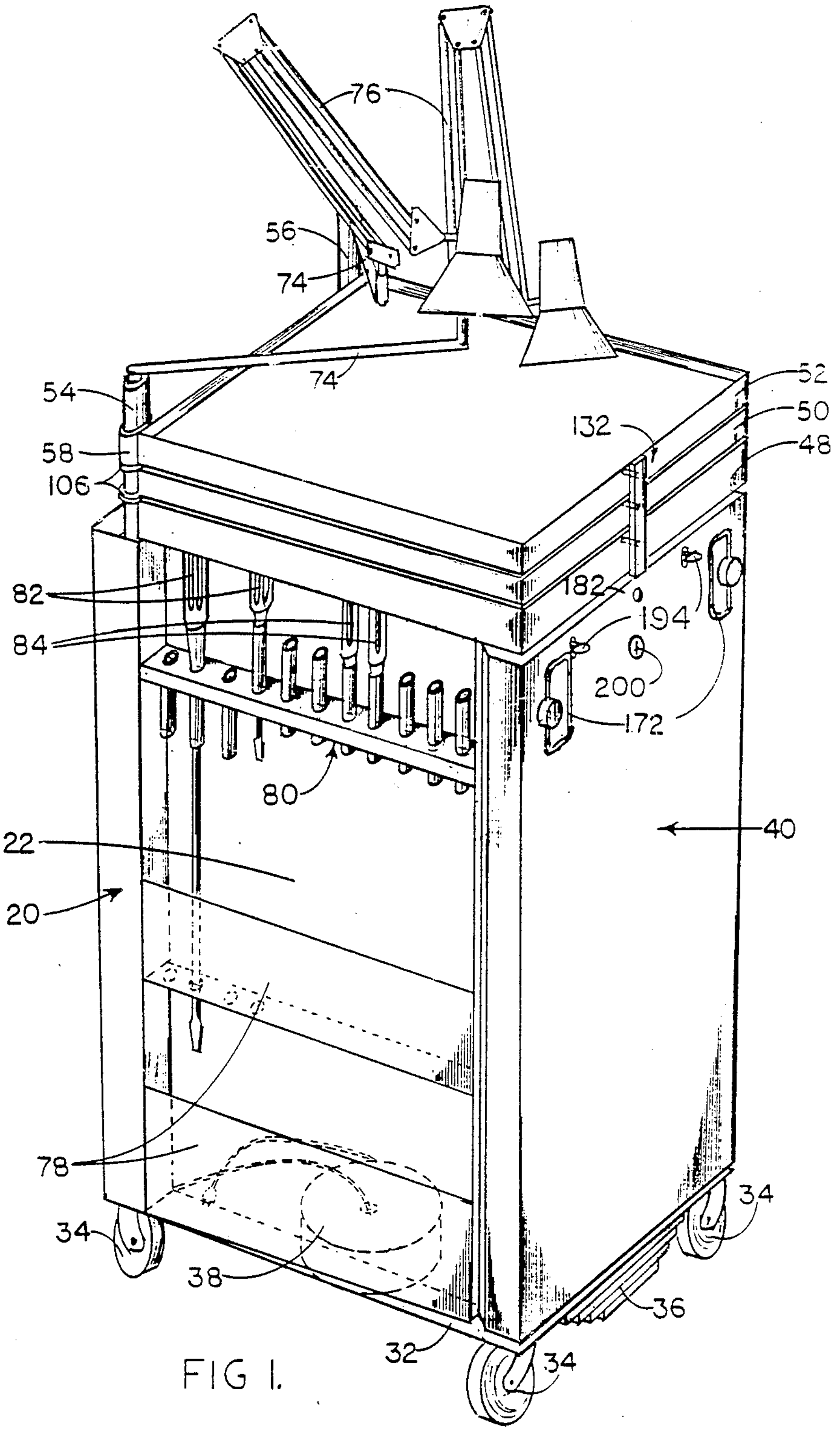
FIG. 1 shows a perspective front and left side elevation view of a mobile tool chest with horizontal pivotal trays.
Figure 2:
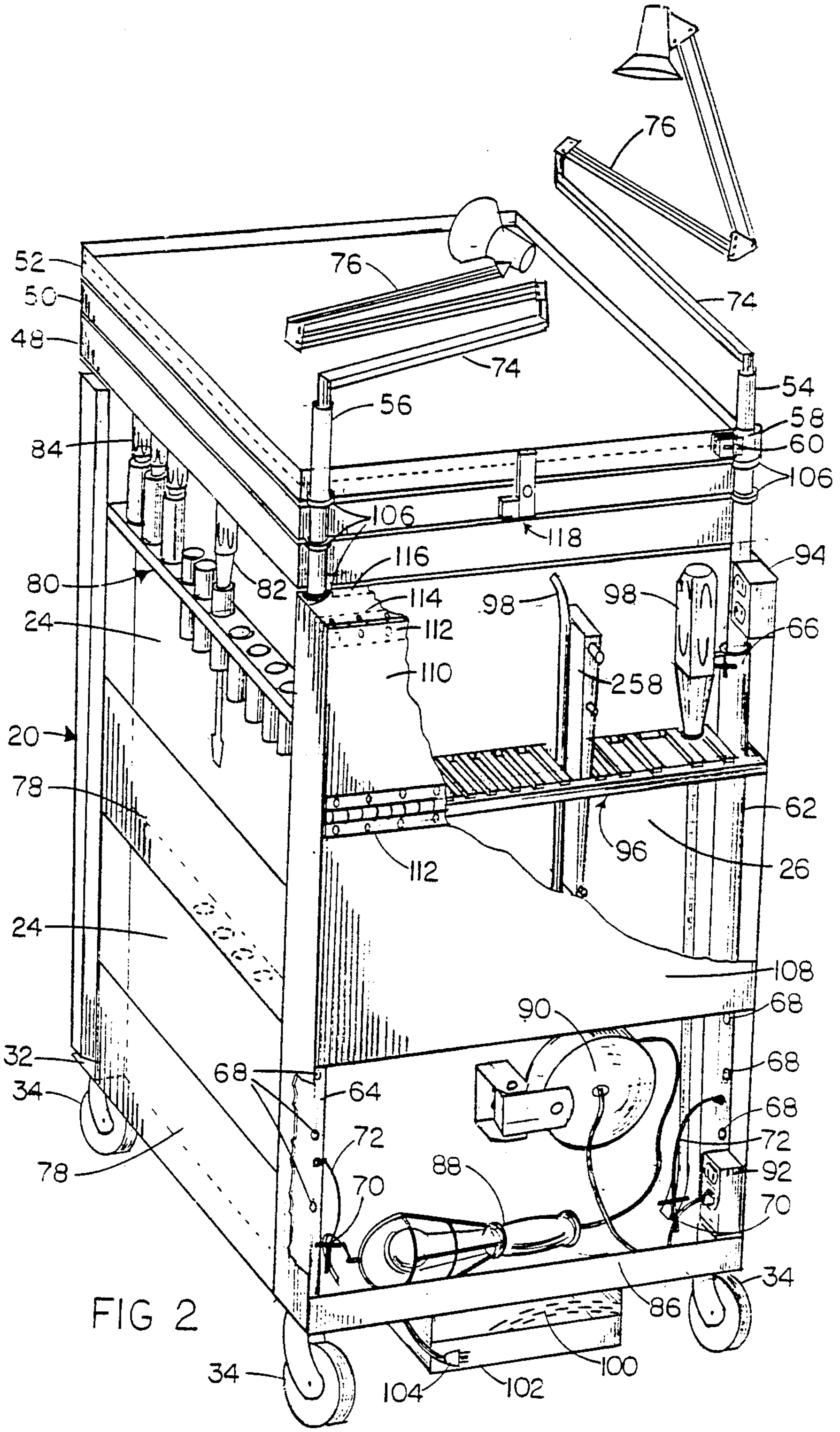
FIG. 2 shows a perspective rear and right side elevation view of the chest of FIG. 1.
Figure 3:
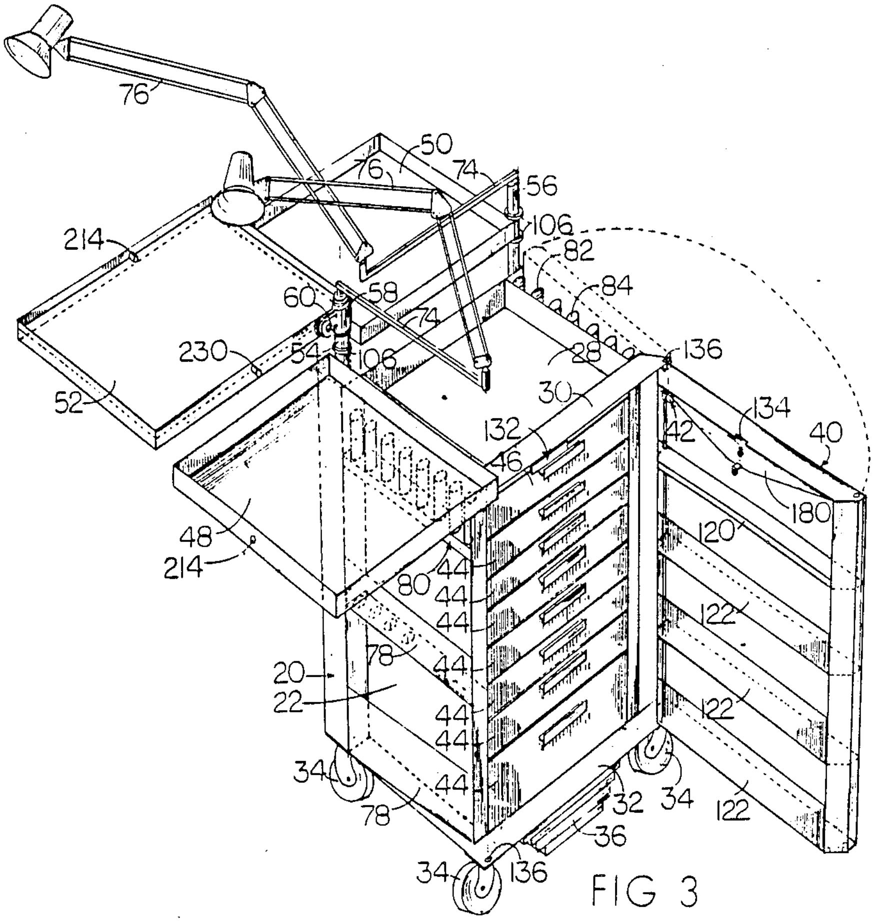
FIG. 3 shows a perspective front and left side elevation view of such chest in one of the preferred arrangements for working.

The tool chest in general, is fabricated from sheet metal and commonly used metal parts or any suitable material such as fiberglass or plastic. FIGS. 1, 2, and 3 show a mobile tool chest constructed according to the preferred embodiment of the invention. FIG. 1 shows an elongated generally upright rectangular support structure 20 which supports a series of tool racks, trays, drawers, and a door discussed below.

FIGS. 1 and 2 show a pair of laterally spaced upright side panels 22 and 24 respectively, the side panels being members inwardly recessed approximately 4 centimeters with an outside and top opening disposed generally parallel to each other and having top, lower, upright front, and upright rear edges. FIG. 2 shows an upright rear panel 26 being a member inwardly recessed approximately 8 centimeters with an outside and top opening having top, lower, upright side edges, and vertical corners being disposed generally normal to the side panels 22 and 24 by attaching the upright rear edges of the side panels 22 and 24 to the vertical corners of the rear panel 26. FIG. 3 shows a top stationary tray 28 being a member inwardly recessed approximately 10 centimeters with a top opening and having top front, rear, and side edges, which are generally positioned normal to the side and rear panels 22, 24, and 26 by attaching the top edges of the tray to the top edges of the rear and side panels. A top front horizontal plate 30 is attached to the top front edge of the stationary tray 28. A base 32 is attached generally normal to the side and rear panels 22, 24, and 26 at the lower edges of same. The plate 30 has a means for mounting a plurality of wheels 34 for mobility and a counter-weight 36 in excess of above 65 kilograms to prevent overturn of the tool chest during normal operating conditions. The minimum desired weight of the counterweight 36 will be readily apparent to those skilled in the art after determining where and what tools are to be stowed and the materials to be used in fabricating the support structure 20. A retractable electrical extension cord reel 38 shown in FIG. 1 is also mounted to the underside of base 32 for providing electrical power to the tool chest from an outside power source.

Figure 7:
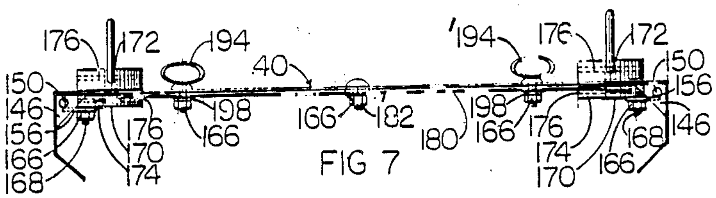
FIG. 7 shows a sectional top view of the hinge, latch, and lock mechanism taken along the line 7—7 of FIG. 6.
Figure 8:
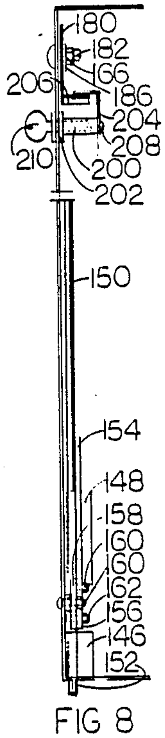
FIG. 8 shows a sectional side view of the hinge, latch, and lock mechanism taken along the line 8—8 of FIG. 6.
Figure 9:
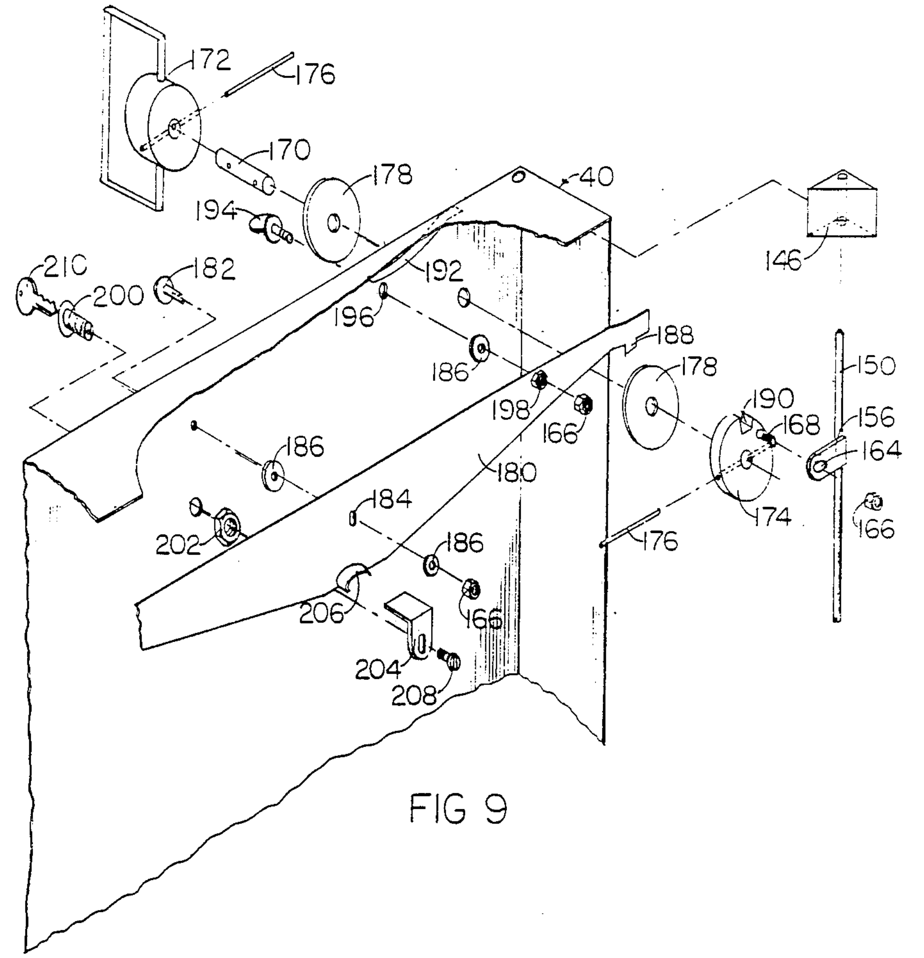
FIG. 9 shows an exploded view of a top portion of the hinge, latch, and lock mechanism.
Figure 15:
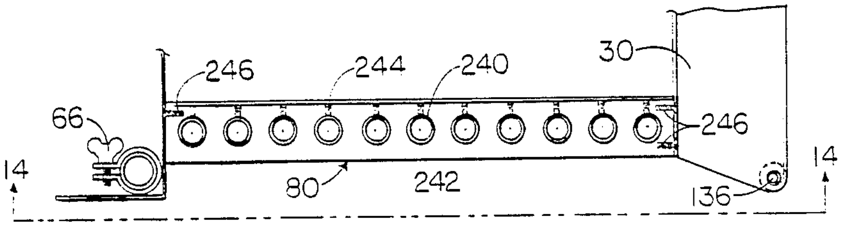
FIG. 15 shows a top view of the side tool racks for stowing screw and nut drivers.
Figure 14:
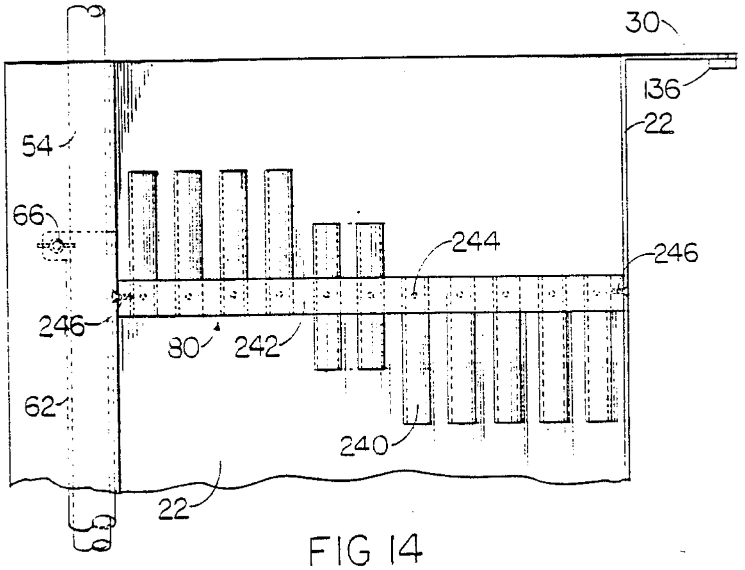
FIG. 14 shows a plan view of the side tool racks for stowing screw and nut drivers.

Referring back to FIG. 3, stowage door 40 is inwardly recessed approximately 8 centimeters. The door is mounted along side 22 and side 24 for selective horizontally pivoting by means of a hinge, latch, and locking mechanism 42 best shown in FIGS. 6, 7, and 8 and described below. A plurality of drawers 44 and a top drawer 46 are mounted within the rectangular structure 20. Lower pivotal tray 48, middle pivotal tray 50, and top pivotal tray 52 are shown mounted to the support structure 20. FIG. 2, viewing from the rear, shows a means for mounting the pivotal trays 48, 50, and 52 directly above and to the structure 20 for horizontal pivot thereto. A corner of the lower tray 48 is fixed normal to a first upstanding extendable pivot post 54. A corner of the middle tray 50 is fixed normal to a second upstanding extendable pivot post 56. The top tray 52 with a vertical hub 58 fixed to one corner is mounted normal to either of the upstanding pivot post 54 and 56 by sliding the hub over the top end of either said posts. A friction lock 60 fixed to the hub 58 provides friction adjustment for restraining the horizontal pivot of the top pivotal tray 52. The vertical extendable pivot post 54 and 56 are mounted within two upstanding tubes 62 and 64 respectively, fixed to the right and left rear corners of the rear panel 26, providing horizontal pivoting of lower tray 48 and middle tray 50 respectively. Friction locks 66 fixed to upstanding tubes 62 and 64 provide frictional adjustment for restraining rotation. The upstanding tubes 62 and 64, having a plurality of vertically aligned holes 68 provide vertical adjustment for the pivotal trays when the posts 54 and 56 are raised and pins 70 are inserted into the desired holes 68. Pins 70 are attached to the tubes 62 and 64 by lanyards 72. A pair of horizontal pivotal arms 74 are inserted into the top of the vertical posts 54 and 56 for pivotally mounting commercially available articulating lamps 76 for illuminating the immediate work area. FIGS. 1 and 2 shows a plurality of horizontal stowage trays 78 and a tool rack 80 attached to side panels 22 and 24 respectively. The tool rack is designed for stowing screw drivers 82 and nut drivers 84 with varied handle lengths. Details of the tool rack construction are shown in FIGS. 14 and 15 and discussed below.

Figure 16:
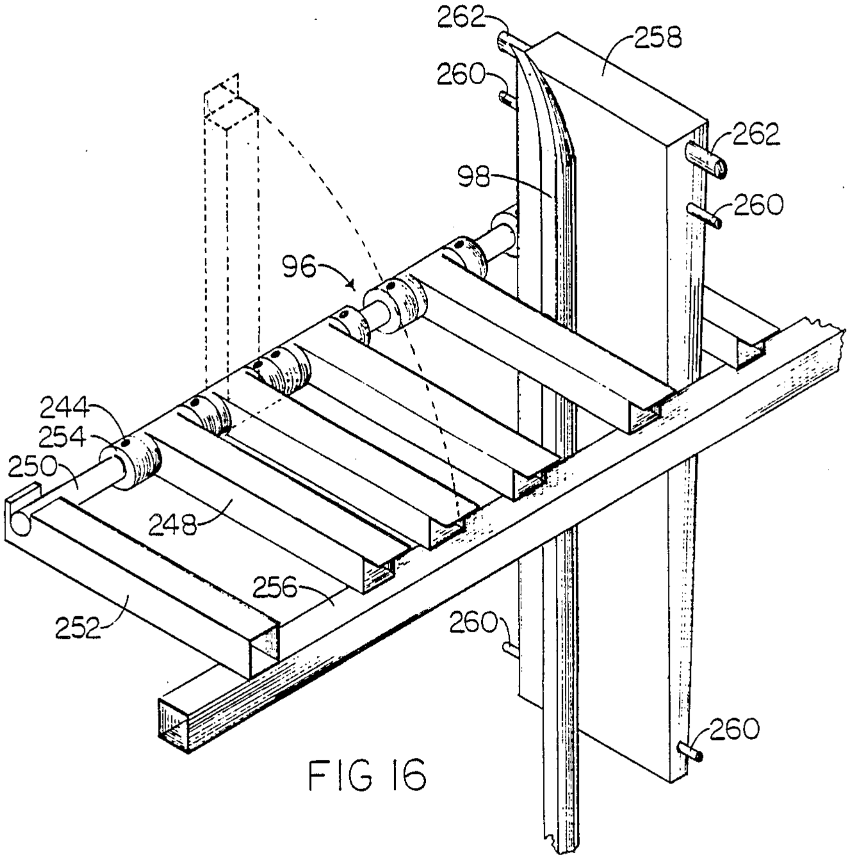
FIG. 16 shows an exploded view of the rear tool rack for stowing various shaped tools longer than the length of stationary top tool tray.

FIG. 2 shows the rear panel 26 with the following attachments: a rear tool rack 96, a lower stowage tray 86, and extension light 88 with retractable reel 90, a lower electrical junction box with a duplex outlet 92, and an upper right duplex outlet box 94 which also represents an upper left duplex outlet box not shown for clarity of the drawing. Details of the rear tool rack 96 are shown in FIG. 16 and discussed below.

FIG. 2 also shows a security chain 100 fixed to the base 32 for securing tool chest to a permanent structure and stowed in a tray 102 fixed to the base 32; an electrical power extension cord 104 is retracted and stowed on the reel 38 shown in FIG. 1. Restraining rings 106 are fixed to the upstanding posts 54 and 56 for vertical restraint of the pivotal trays 48, 50, and 52 while in the stowed position.

A stationary vertical rear panel 108 is fixed to the upright side edges of the rear panel 26. A lower horizontal edge of a vertical security panel 110 is attached to a top horizontal edge of the stationary vertical rear panel 108 by means of a piano hinge 112. An outward edge of a horizontal security panel 114 is attached to a top horizontal edge of the vertical security panel 110 by means of a piano hinge 112. A vertical latching flange 116 extended downward approximately two centimeters is attached to an inward edge of and normal to the horizontal security panel 114. The latching flange 116 extends downward for engaging over the top edge of the top stationary tray 28. A rear latching bar assembly 118, details shown in FIG. 13 and discussed below, is mounted on the middle pivotal tray 50 to engage the top pivotal tray 52 when the trays are in a secured position.

Figure 4:
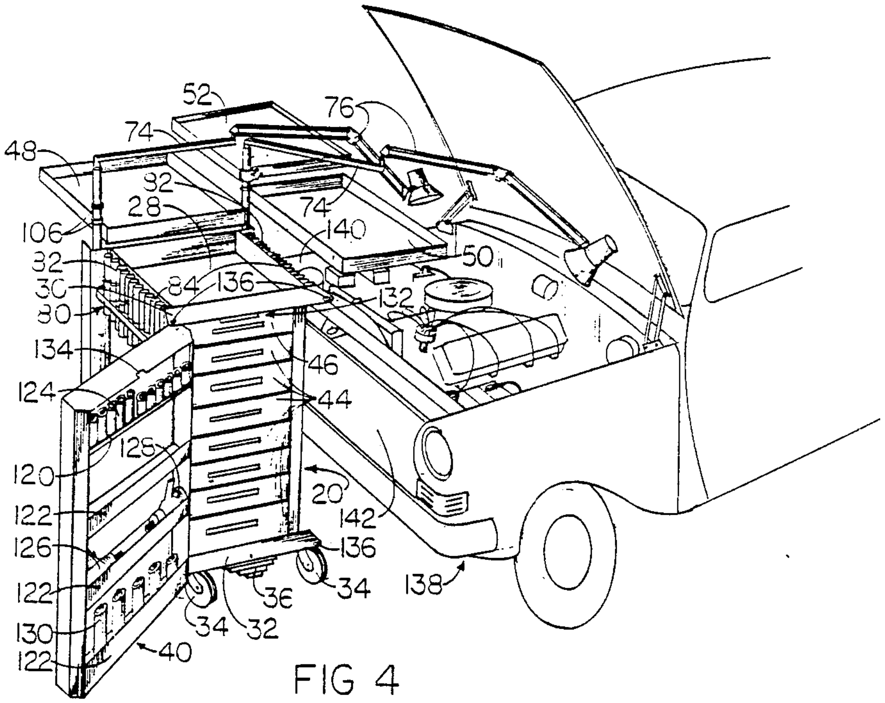
FIG. 4 shows a front perspective view of such chest in one of the preferred arrangements and placement for working within the engine compartment of a vehicle.

FIG. 4 shows a front perspective view of the tool chest in a preferred arrangement and placement for use while working within the engine compartment of a vehicle 138 with the pivotal tray 50 extending over a grill 142, the pivotal tray 52 extending over a fender 140 and the door 40 in the open position. A plurality of trays are mounted within the recessed door 40. The top tray 120 is for stowing and displaying sockets 124 on racks. The lower trays 122 are for stowing and displaying spray cans 130 and power tools such as impact wrenches 126, drill motors 128, power drivers, etc.

Figure 5:
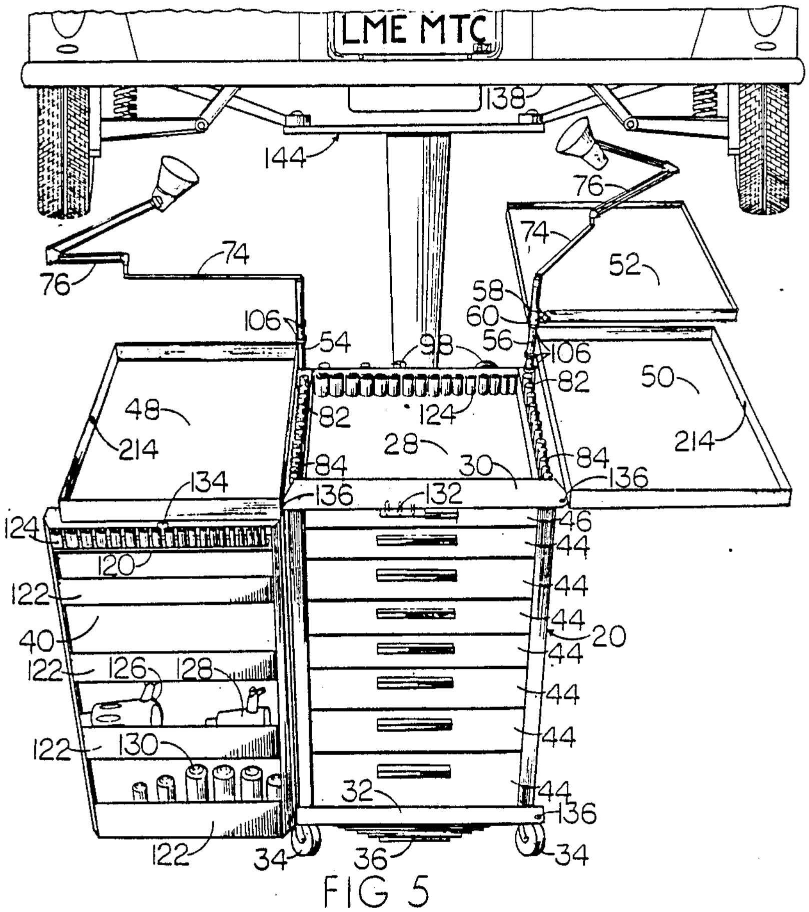
FIG. 5 shows a perspective view of such chest in one of the preferred arrangements and placement for working under a vehicle elevated on a floor hoist.

FIG. 5 shows the tool chest in a preferred position and arrangement for use while working under a vehicle 138 which is elevated on a hoist 144.

Referring back to FIG. 2 which shows a perspective rear right side elevation of the tool chest in the secured position, the security panels 110 and 114 are in the closed position with the latching flange 116 engaged over the rear edge of the horizontal stationary top tool tray 28. The pivotal tool trays 48, 50, and 52 are in the closed position being disposed directly above the structure 20 interlocked with the vertical restraining rings 106. The top tray 52 is latched to the middle tray 50 by engaging the rear latching bar assembly 118 attached to the middle pivotal tray 50.

The lower pivotal tray 48 restrains the latching flange 116 of the horizontal security panel 114. The top tray is symmetrical top and bottom. When relocating it to the other vertical post it should be rotated horizontally 180 degrees, presenting a mirror image to permit securing of the pivotal trays without relocating.

FIG. 1 shows a perspective front and left side elevation of the tool chest in the secured position. A front latching bar 132 is engaged in the horizontal pivotal trays 48, 50, and 52, restraining tray movement and preventing removal of tools from the fixed top tray 28, lower pivotal tray 48, middle pivotal tray 50, the two side tool racks 80, and the rear tool rack 96 by restraining the latching flange 116 on horizontal security panel 114 over the rear edge of the stationary tool tray 28. The front latching bar 132 is restrained by engagement of a door notch 134 shown in FIG. 3 when door 40 is in the closed position. The door 40 is latched by rotating the handles 172 of the hinge, latch, and locking mechanism 42 and locked when both tab releases 194 are in the down position and secured by the lock actuating device 200.

Figure 6:
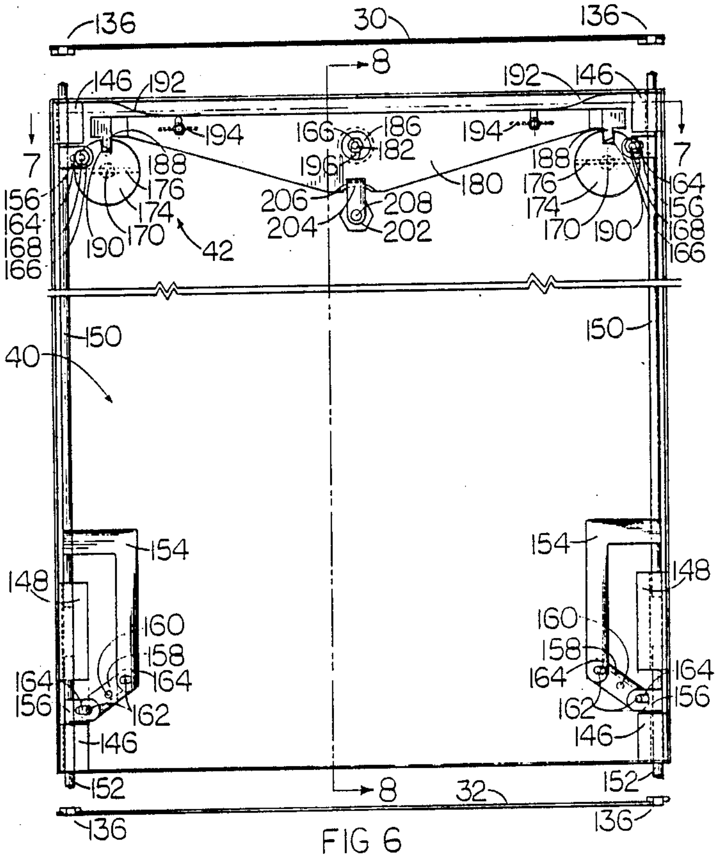
FIG. 6 shows a plan view of the hinge, latch and lock mechanism mounted inside the front door.

FIGS. 6 plan view, 7 top view, 8 side view, and 9 exploded view show details of the hinge, latch, and lock mechanism of the door. The door is adapted for mounting to the top horizontal plate 30 and base 32 allowing a swinging motion of approximately 260 degrees from either side. The door is provided at opposite sides with guides 146 and 148 which slide mount a pair of rod members, upper rods 150 and lower rods 152 respectively. Offset arms 154 fixed to the lower portion of the upper rod members 150 are connected to tabs 156 fixed to the upper portion of the lower rods 152 through medium links 158. The links are pivotally mounted intermediate their ends on pivot pins 160 mounted inside to panel of the door 40 and have pins 162 and slots 164 connections at each end of the links with the arms 154 and tabs 156.

Positioned at the upper corners and transversely disposed through the panel of door 40 are a pair of shafts 170 mounted with operating handles 172 at the outer ends thereof and disks 174 to the inner ends and retained by roll pins 176. Spacer washers 178 are mounted on shaft 70 adjacent to both sides of door 40. The inner ends, with horizontally extended slots, of tabs 156 are located adjacent to the outer periphery of disks 174. The tabs are pivotally connected to the disks by means of pivot pins 168 protruding through the slots and fixed to the outer periphery of the disks. Nuts 166 retains the tabs on the pins 168. The outer ends of the tabs 156 are fixed normal to a upper portion of the upper rods 150. Rotating the disk 174, by utilizing the handle 172, provides a sliding movement of the rods 150 and 152 in opposite directions for either retraction or projection beyond the ends of the door 40. The base 32 is provided at opposite corners thereof with bearing members 136, arranged in line with rod members 152 when the door is in closed position so that the projection of these rod members beyond the lower ends of the guides 146 will seat the same within the bearings 136. The horizontal top plate 30 is also provided at opposite corners thereof with bearing members 136 arranged in line with the rod members 150 when the door is in the closed position so that the projection of these rod members beyond the upper ends of guides 146 will seat the same within the bearing 136.

A locking bar 180 is pivotally mounted on vertical center line of the door 40 by bolt 182 and spaced out from panel of the door by washer 186 and retained by washer 186 and nut 166. The bar is provided at opposite ends thereof with vertical tab members 188 arranged in line with vertical notches 190 on the top periphery of disks 174 when the door is in the closed and latched position. Vertical tabs 188 are engaged in the notches 190 when urged and retained by means of inward extending flat leaf springs 192. Pin 182 and slot 184 are located at an appropriate relative height to prevent disengagement of both tabs 188 simultaneously. Tab releases 194 are mounted through slots 196 to the locking bar 180 by means of fixed nuts 198 and self locking nuts 166. Lifting tab release 194 disengages the respective tab 188 from notch 190, permitting rotation of disk 174 by handle 172 and disengages rods 150 and 152 from bearings 136 for opening the door 40 by swinging from opposite side.

Lock actuating device 200 is restrained in the door 40 by retaining nut 202. Arm 204 is restrained on the lock actuating device 200 by bolt 208. Rotating the lock actuating device 200 as to deposit locking arm 204 directly above horizontal tab 206, restrains the locking bar 180 in a secured position securing the tool chest when key 210 is removed.

Figure 10:
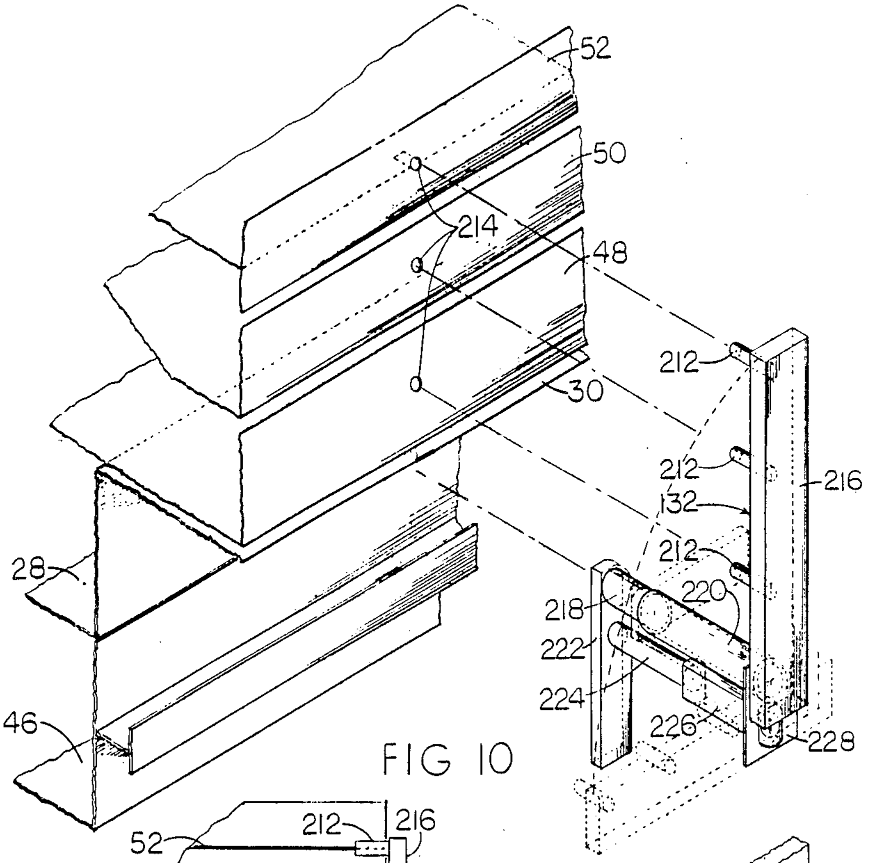
FIG. 10 shows an exploded view of the front latching bar assembly including the lock actuating device in the secured position.

FIG. 10 shows an exploded view of a front latching bar assembly 132 comprising a plurality of pins 212 fixed normal to an upstanding rectangular bar 216 to engage and restrain the front of pivotal trays 48, 50, and 52 by means of tray holes 214. The lower end is fixed normal to the front of a shaft 218, encased in a tube 220 mounted to the underside middle of the top front horizontal plate 30, providing rotation and slidable movement for the shaft 218. Rectangular strap 222 is fixed normal to the shaft 218 at the rear end and parallel with the rectangular bar 216 extending in the opposite direction.

Figure 11:
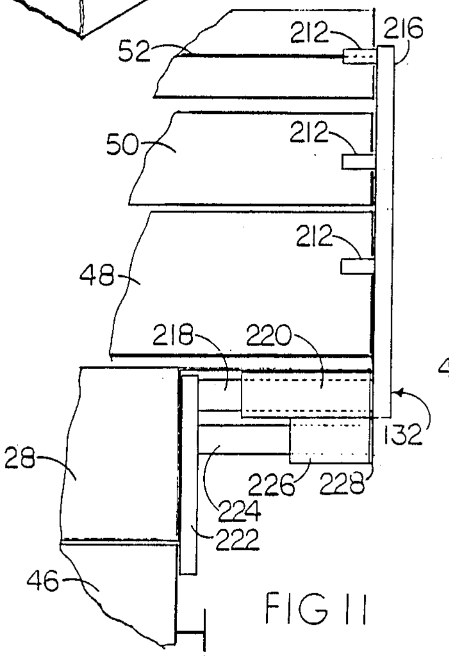
FIG. 11 shows a side view of the front latching bar assembly including the lock actuating device in the secured position.

FIG. 11 shows the rectangular strap 222 restrained by a plunger 224 of a lock actuating device 226 in the locked position, disposed directly beneath the tube 220 by means of a mounting plate 228 attached to the plate 30. When in the vertical position and restrained by plunger 224, the strap 22 restrains the top drawer 46 which restrains the lower drawer 44 by a commercially available inner latching bar, not shown. The dotted line shows the latching bar assembly 132 in the unlocked stowed position.

Figure 12:
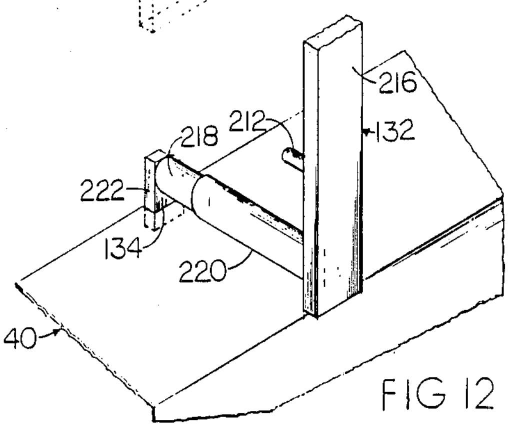
FIG. 12 shows an exploded view of the lower portion of the front latching bar assembly with the lock actuating device and mounting bracket removed and replaced by a door.

FIG. 12 shows a portion of the front latching bar assembly 132 with the lock actuating device 226 and the mounting bracket 228 removed when the front door 40 is included in the design. The rectangular strap 222 is shortened and retained by the door 40 with a notch 134 in the top of the door.

Figure 13:
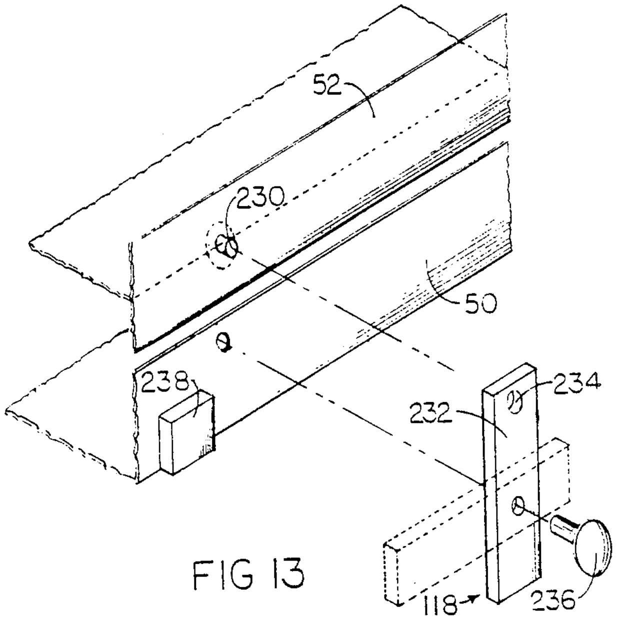
FIG. 13 shows an exploded view of the rear latching bar assembly in the latching position.

FIG. 13 shows the rear latching bar assembly 118 consisting of a pin 230 fixed normal to and centered on the rear of the top pivot tray 52 to engage the rectangular bar 232 with hole 234. Said rectangular bar 232 is vertically centered and pivotally mounted to the middle pivotal tray 50 by means of pin 236. Index block 238 mounted to the middle tray 50, aligns rectangular bar 232 in a latching position and a stowed position as indicated by dotted lines.

FIGS. 14 and 15 shows horizontal and vertical views respectively of the side tool racks 80 comprising a plurality of vertical tubes 240 for encasing the shanks of screw drivers 82 and nut drivers 84 mounted for vertical adjustment within a horizontal rectangular bar 242. The tubes are vertically restrained in the desired position by allen set screws 244. The horizontal bar 242 is mounted to the recessed side panels 22 and 24 by machine screws 246.

FIG. 16 shows a detailed description of the rear tool rack assembly 96 for stowing various shaped tools longer than the length of the stationary top tray 28. A plurality of vertically rotatable fingers 248 are mounted to slide on rod 250 which is horizontally mounted to the rear panel 26, by means of brackets 252. The fingers are horizontally restrained on rod 250 by retainer collars 254 and allen set screws 244. Horizontal bar 256 mounted on the rear panel 26 restrains fingers 248 from rotating below the horizontal position. Wedge 258 captivated by pins 260 provides means for restraining tools with no enlarged ends including pry bars 98. Pins 262 provides hand grips for positioning.

OPERATION OF INVENTION

The mobile tool chest, best shown in FIGS. 1, 2, and 3, will provide stowage in excess of 200 commonly used tools in an orderly manner for ready access to the user. Additional stowage is provided for infrequently used tools in a plurality of drawers. Prior to using the tool chest, the user should first evaluate his task, tools available, and the flexibility of the tool chest. One of the preferred stowage arrangement, utilizing commercially available mounting racks for sockets and wrench organizer racks comprises:

(a) the top horizontal pivotal tool tray 52 for temporary stowage of parts and infrequently used tools required for the immediate tasks;

(b) the middle horizontal pivotal tool tray 50 for stowage and display of assorted tools including pliers, cutters, hammer, mallet, claw fingers, magnetic retriever, distributor wrenches, etc;

(c) the lower horizontal pivotal tool tray 48 for stowage and display in excess of 50 open end, box end, and combination wrenches;

(d) the side tool racks 80 for stowage and display in excess of 20 screw drivers 82 and nut drivers 84;

(e) the rear tool rack 96 for stowing and displaying a plurality of various shaped tools longer than the length of the stationary top tray 28, such as pry bars 98, torque wrenches, etc;

(f) the stationary top tool tray for stowing and displaying in excess of 100 assorted wrenches including sockets 124, extension bars, ratchets, etc;

(g) the top horizontal stowage tray 120 in door 40 for stowing and displaying sockets 124;

(h) the lower horizontal trays in the door 40 for stowage and display of spray cans 130 and power tools such as impact wrenches 126, drill motors 128, power drivers, etc;

(i) a plurality of drawers 44 and top drawer 46 for stowing of infrequently used tools;

(j) the side horizontal stowage trays 78 in FIGS. 1 and 2 for stowing articles not requiring security; and (k) the rear lower stowage tray 86 for stowing articles not requiring security, including extension light 88.

The side tool racks are mounted in the recessed side panels 22 and 24 shown in FIGS. 1 and 2 respectively being disposed directly under the lower horizontal pivotal tool tray 48 when in the stowed position. This provides security for the screw drivers 82 and nut drivers 84.

The side tool racks 80, are adjusted in reference to FIGS. 14 and 15. Open door 40, remove mounting screws 246, and the horizontal bar 242. Loosen allen set screws 244 attached to horizontal bar 242 retaining the vertical tubes 240. Position the screw drivers 82 and nut drivers 84 in the vertical tubes 240 in the order desired. Vertically adjust the tubes to position the tops of the drivers' handles to the desired even height. Secure the retaining screws 244 and replace the horizontal bar 242 in the reverse order.

The rear tool rack 96 mounted in the recessed rear panel 26 shown in FIG. 2 provides stowage for various shaped tools longer than the length of the stationary top tool tray 28, comprising pry bars, torque wrenches, etc. To adjust the rear tool rack 96, refer to FIG. 16. Designate the desired relative position of the tools to be stowed. To stow a long tool with at least one enlarged end, select a pair of fingers 248 with retaining collars 254 on each side; loosen allen set screws 244 in same. Vertically rotate the fingers on pivot rod 250, as required, and insert the designated tool with an enlarged end at the top between the fingers and return to the horizontal position. Adjust the fingers horizontally along the rod to locate the tool in the desired position and sufficiently close to prevent the upper end of the tool from falling through the fingers. Position the restraining collars 254 next to the fingers and secure allen set screws 244 to restrain same in the horizontal plane and permit vertical rotation. A tool is removed vertically, causing vertical rotation of the fingers, permitting clearance of an enlarged lower end of the tool. To stow an elongated tool with no enlarged end, loosen the adjacent retaining collars 254 of a selected pair of fingers 248; rotate fingers to a vertical position and insert a wedge bar 258, thick end up between fingers. Lower fingers to a horizontal position; insert a selected tool between a finger and the wedge bar with the bar positioned approximately one half length above the fingers and tool at the desired height. Horizontally adjust the fingers against tool and wedge bar to restrain the tool. Horizontally restrain the fingers 248 with the restraining collars 254 and secure the allen screws 244. Additional stowage space may be achieved by utilizing a common finger for retaining two tools. A variety of combinations of fingers and collars may be achieved by removing the horizontal rod 250 from the mounting brackets 252 and sliding fingers and collars off either end.

FIG. 4 shows a preferred placement of the tool chest and arrangement of the pivotal trays 48, 50, 52, and door 40 for display and usage of tools while working within an engine compartment of the vehicle 130. The trays 48, 50 and 52 may be elevated to horizontally clear a fender 140 or grill 142 by loosening the friction locks 66, raising the posts 54 and 56 and inserting pins 70 into appropriate holes 68 to retain the trays at the desired height. A mirror image of the arrangement may be achieved for working within the opposite side of the engine compartment by mounting the top tray 52 on the opposite post after horizontally rotating it 180 degrees so that the tool chest may also be secured in this arrangement.

FIG. 5 shows a preferred placement of the tool chest and arrangement of the pivotal trays 48, 50, 52, and the door 40 for display and usage of tools while working beneath the vehicle 138 elevated on a hoist 144. Another preferred arrangement for the same working conditions is shown in FIG. 3 with the door 40 positioned as represented by the dotted line.

Having been assigned a task, a typical procedure follows:

(a) unlock and stow the security chain 100 in the stowage tray 102;

(b) position the tool chest in the desired location, preferably as close to the components to be worked on as permissible;

(c) extend the electrical power cord 104 and engage in a suitable power source;

(d) unlock and open the stowage door 40 to the desired position;

(e) disengage and swing down front latching bar assembly 130 to stowed position;

(f) swing out and locate the pivot trays 48, 50, and 52 to the desired arrangement;

(g) swing open the security panels 110 and 114;

(h) position the articulating lamps 76 to adequately illuminate the work area with minimum impairment of the user's movement;

(i) place any special seldom used tool required for immediate task on the top tray;

(j) while performing the task, place the smaller parts removed on the top tray;

(k) replace each tool after use for ready future use, eliminating clutter and searching for used tool when reassembling;

(l) secured stowage is achieved by reversing the procedure.

CONCLUSION AND SCOPE OF INVENTION

While my above description contains many specifications these should not be construed as limitations on the scope of the invention, but merely as an example of preferred embodiments thereof. Many other variations are possible. It should be realized that the door may be eliminated in the design, extending the side panels, base, top stationary trays, and drawers outwardly to the front and flush with the front of the pivotal trays. The front latching bar would be engaged by the top drawer in place of the door. Securing the drawers would be by any of the conventional means for locking a plurality of drawers. Removable trays may be placed in the pivotal trays 48 and 50, assigning one tray for standard tools and another for metric tools. Depending on the vehicle to be worked on, foreign or domestic and the desired position of the tool chest, the removable trays could be interchanged between pivotal trays 48 and 50 for achieving an easier access to the required tools. Utilizing a split hinge collar with a hinged friction lock would provide means for removing and relocating the top pivotal tray 52 from one pivot post to the other pivot post without displacing pivotal arms 74. Accordingly, the scope of the invention should be determined not only by the embodiments illustrated, but by the appended claims and their legal equivalents.

I claim:

1. A mobile tool chest for securing and displaying a plurality of stowed tools in an orderly manner for ready access comprising:

(a) an elongated generally upright rectangular support structure;

(b) a plurality of generally rectangular pivotal trays disposed above and pivotally mounted to said support structure for pivoting horizontally with respect thereto between a stowed position adjacent and directly above said support structure and extended positions for display and access of tools;

(c) a counterweight mounted to lower extremities of said support structure for preventing over-turn of same with said pivotal trays extended from said support structure;

(d) a plurality of wheels mounted to lower extremities of said support structure for mobility of said mobile tool chest on a supporting surface;

(e) locking means for releasably locking said pivotal trays in a stowed position for securing said stowed tools against unauthorized access;

(f) removable key means for controlling locking and releasing of said locking means; and (g) said support structure comprising:

a pair of laterally spaced upright side panels, said panels being inwardly recessed members with an outside and top opening disposed generally parallel to each other and having top, lower, upright front, and upright rear edges;

an upright rear panel, said rear panel being an inwardly recessed member with an outside and top opening having top, lower, upright side edges, and vertical corners being disposed generally normal to said side panels by attaching said vertical corners to the upright rear edges of said side panels;

a top stationary tray, said tray being an inwardly recessed member with a top opening and having top front, rear, and side edges being disposed generally normal to said side and rear panels by attaching edges of said top stationary tray to top edges of said side and rear panels; and a base attached generally normal to said side and rear panels at the lower edges of same having means for mounting said plurality of wheels and said counterweight.

2. The tool chest of claim 1 wherein said side panels further comprise a side tool rack, horizontally mounted within the recess of said side panels, means for stowing a plurality of tools with various length handles in a vertical position adjacent to each other with handle tops horizontally aligned and being disposed directly below said pivotal trays in the stowed position preventing removal of the tools.

3. The tool chest of claim 2 wherein said tool rack comprises:

(a) a rectangular bar horizontally mounted within an upper part of the recess of said side panels, extending between the upright front and upright rear edges;

(b) a plurality of vertically adjustable tubes mounted in horizontally spaced apart relationship on said rectangular bar at variable heights; and (c) means for vertically restraining said tubes to said rectangular bar at variable heights.

4. The tool chest of claim 1 wherein said rear panel further comprises a rear tool rack horizontally mounted within the recess of said rear panel, extending between the upright side edges, means for stowing various shaped tools longer than the length of said stationary top tray.

5. The tool chest of claim 4 wherein said rear tool rack comprises:

(a) a horizontal pivot rod mounted within an upper part of the recess of said rear panel extending between the upright side edges;

(b) a plurality of horizontal fingers horizontally spaced and mounted to vertically pivot and horizontally slide on said pivot rod;

(c) a horizontal bar mounted within said rear panel on the same horizontal plane and parallel to said pivot rod, for disposing said fingers in a horizontal position and restraining same from vertical movement below the horizontal;

(d) a plurality of restraining collars mounted on said pivot rod intermittently spaced between said fingers, means for adjusting horizontal spacing of said fingers; and (e) a plurality of tapered wedges of approximately 7 degrees or less, with thick end up vertically captivated and mounted between two of said fingers for vertical movement, means for restraining elongated tools with no enlarged ends.

6. The tool chest of claim 4 further comprising a means for securing the tools in said rear tool rack.

7. The tool chest of claim 6 wherein means for securing the tools in said rear tool rack further comprises:

(a) a stationary vertical panel having a top and lower horizontal edge, extending between and mounted to the upright side edges of said rear panel;

(b) a vertical security panel having a top and a lower horizontal edge, extending between the upright side edges of said rear panels;

(c) a hinge, means for pivotally mounting the lower horizontal edge of said vertical security panel to the upper edge of said stationary vertical panel;

(d) a horizontal security panel having an inward and outward horizontal edge, extending between the upright side edges of said rear panel;

(e) a hinge, means for mounting the outward edge of said horizontal security panel to the upper edge of said vertical security panel; and (f) a latching flange attached to the inward horizontal edge of said horizontal security panel extending downward to engage the rear edge of said top tray being disposed directly below said pivotal trays when in stowed position and being restrained by same.

8. A mobile tool chest for securing and displaying a plurality of stowed tools in an orderly manner for ready access, comprising:

a generally rectangular, upright support frame having an upper, horizontal top and a lower, horizontal base;

a plurality of generally rectangular pivot trays pivotally mounted on the top of said support frame;

a plurality of wheels mounted on the base of said frame;

pivot means projecting upwardly from one side edge of the top of said frame for pivotally supporting said pivot trays for pivoting horizontally with respect to said support frame between a stowed position adjacent and directly above said support frame and an extended position projecting outwardly from said support frame to expose the top of said frame and each of said trays for display and access to tools on said trays;

counterweight means mounted on the lower part of said frame adjacent the opposite side edge of said frame to said pivot means for opposing tipping of said frame when said trays are in said extended position; and securing means for releasably securing said pivotal trays in said stowed position;

said top of said frame comprising a horizontal upper storage tray, said plurality of pivot trays covering said upper tray in said stowed position and exposing said upper tray in said extended position.

9. The tool chest of claim 8 further comprising:

(a) at least two upstanding pivot posts mounted in vertical corners of said frame;

(b) a vertical hub mounted to a corner of each of said plurality of trays, means for pivotally mounting on said pivot posts; and (c) a plurality of restraining collars mounted on said posts, means for vertical restraining of said pivot trays.

10. The tool chest of claim 9 further comprising means for mounting at least one articulating lamp comprising at least one horizontal pivotal arm mounted on said posts with a vertical hub fixed to an extended end of said arm for horizontal pivot mounting of the lamp.

11. The tool chest of claim 9 further comprising means for vertical adjustment of said pivotal trays.

12. The tool chest of claim 11 wherein said means for vertical adjustment of said pivotal trays comprises:

(a) at least two upstanding tubes having a plurality of holes on a vertical axis mounted in vertical corners of said frame encasing said pivot posts, means for vertical telescoping and horizontal pivoting of said posts; and (b) a pin inserted in one of the plurality of holes and below lower end of said posts, means for retaining said pivot trays at desired height.

13. The tool chest of claim 11 further comprising means for mounting said pivotal trays comprising:

(a) means for fixing a corner of a lower tray normal to first of said vertical pivot posts;

(b) means for fixing a corner of middle tray normal to second of said vertical pivot posts; and (c) a vertical hub fixed to said top tray, means for pivotal mounting said tray on either of said vertical posts.

14. A mobile tool chest for securing and displaying a plurality of stowed tools in an orderly manner for ready access comprising:

(a) an elongated generally upright rectangular support structure;

(b) a plurality of generally rectangular pivotal trays disposed above and pivotally mounted to said support structure for pivoting horizontally with respect thereto between a stowed position adjacent and directly above said support structure and extended positions for display and access of tools;

(c) a counterweight mounted to lower extremities of said support structure for preventing over-turn of same with said pivotal trays extended from said support structure;

(d) a plurality of wheels mounted to lower extremities of said support structure for mobility of said mobile tool chest on a supporting surface; and (e) locking means for releasably locking said pivotal trays in a stowed position for securing said stowed tools against unauthorized access, said locking means for securing said pivotal trays to said structure for securing the stowed tools comprising:

a rear latching bar assembly mounted to the rear edge of said middle pivotal tray engaged to said top tray, means for vertically restraining same when being disposed directly above said middle tray;

a front latching bar assembly mounted to the top front of said structure engaged to said pivotal trays when being disposed directly above said structure, said latching assembly comprising means for restraining said pivotal trays in a restraining position; and a lock actuating device mounted to the top front of said structure for engaging and restraining said latching bar assembly in said restraining position, said actuating device comprising means for securing said front latching bar assembly.

15. The tool chest of claim 1 wherein said support structure further includes a plurality of drawers secured by a top drawer and mounted within said structure.

16. The tool chest of claim 15 wherein said means for securing said pivotal trays to said structure for securing the stowed tools comprises:

(a) a rear latching bar assembly mounted to the rear edge of said middle pivotal tray engaged to said top tray, means for vertically restraining same when being disposed directly above said middle tray;

(b) a front latching bar assembly mounted to the top front of said structure engage to said pivotal trays, being disposed directly above said structure, said bar assembly extended downward being disposed directly in front of said top drawer, means for restraining said pivot trays and said drawer;

(c) an internal latching bar, means for said top drawer to restrain a plurality of lower drawers when disposed in the closed position; and (d) a lock actuating device mounted to the top front of said structure engaged and restraining said latching bar assembly in restraining position, means for securing said latching bar assembly.

17. A mobile tool chest for securing and displaying a plurality of stowed tools in an orderly manner for ready access comprising:

(a) an elongated generally upright rectangular support structure;

(b) a plurality of generally rectangular pivotal trays disposed above and pivotally mounted to said support structure for pivoting horizontally with respect thereto between a stowed position adjacent and directly above said support structure and extended positions for display and access of tools;

(c) a counterweight mounted to lower extremities of said support structure for preventing over-turn of same with said pivotal trays extended from said support structure;

(d) a plurality of wheels mounted to lower extremities of said support structure for mobility of said mobile tool chest on a supporting surface;

(e) locking means for releasably locking said pivotal trays in a stowed position for securing said stowed tools against unauthorized access;

(f) removable key means for controlling locking and releasing of said locking means; and (g) a vertical door pivotally mounted on said structure, said door further comprising an inward recessed panel with a plurality of horizontal trays.

18. The tool chest of claim 17 wherein said door further comprises a hinge, latch, and lock mechanism, means for opening said door from either side for horizontal rotation to approximately 260 degrees, closing, latching, and locking.

19. The tool chest of claim 18 further comprises means for securing said pivotal trays to said structure for securing the stowed tools comprising:

(a) a rear latching bar assembly mounted to the rear edge of said middle pivotal tray engaged to said top tray, means for vertically restraining same when being disposed directly above said middle tray;

(b) a front latching bar assembly mounted to the top front of said structure engaged to said pivot trays when being disposed directly above said structure, said bar assembly extended downward being disposed directly behind top of said door when same is in closed position, means for restraining said pivotal trays;

(c) the top of said door with a notch for engagement of said latching bar when in restraining position, means for securing said latching bar assembly when said door is secured.

20. The tool chest as claimed in claim 8, wherein said pivot means comprises a first pivot post projecting upwardly from one corner of the top of said frame and a second pivot post projecting upwardly from an adjacent corner of the top of said frame, at least one of said pivot trays being pivotally mounted at one corner on said first pivot post and at least one other pivot tray being pivotally mounted at an adjacent corner on said second pivot post.

21. A tool chest of claim 8 further comprising an integral electrical power distribution system comprising:

(a) an electrical distribution junction box mounted on said support frame;

(b) a retractable electrical extension cord mounted on said frame and connected to said junction box, means for providing electrical power from an outside source to said tool chest;

(c) a retractable extension light mounted on said frame and connected to said junction box; and (d) a plurality of electrical duplex outlets mounted on said frame and connected to said junction box.

* * * * *